(12) United States Patent
Sarkkinen

(10) Patent No.: US 7,649,865 B2
(45) Date of Patent: Jan. 19, 2010

(54) SERVICE-ACTIVATION BASED STATE SWITCHING

(75) Inventor: Sinikka Sarkkinen, Kangasala (FI)

(73) Assignee: Nokia Corporation, Espoo (FI)

( * ) Notice: Subject to any disclaimer, the term of this patent is extended or adjusted under 35 U.S.C. 154(b) by 816 days.

(21) Appl. No.: 10/689,601

(22) Filed: Oct. 22, 2003

(65) Prior Publication Data

US 2004/0127243 A1 Jul. 1, 2004

Related U.S. Application Data

(60) Provisional application No. 60/424,705, filed on Nov. 8, 2002.

(51) Int. Cl.
*H04Q 7/00* (2006.01)
*H04B 7/00* (2006.01)

(52) U.S. Cl. ........................... 370/331; 455/70

(58) Field of Classification Search .................. 370/437, 370/329, 466; 455/343, 455, 458, 70; 371/331
See application file for complete search history.

(56) References Cited

U.S. PATENT DOCUMENTS 5,930,706 A * 7/1999 Raith ...................... 455/422.1
2002/0126636 A1* 9/2002 Chen ......................... 370/329

OTHER PUBLICATIONS

ETSI: "Universal Mobile Telecommunications System (UMTS); Multimedia Broadcast/Multicast Service (MBMS); Stage 1 (3GPP TS 22.146 version 5.2.0 Release 5)", ETSI TS 122 146, Mar. 1, 2002, pp. 1-15, XP002304092 France.
ETSI: "Universal Mobile Telecommunications System (UMTS); Radio resource Control (RRC) protocol specification (3GPP TS 25.331 version 5.2.0 Release 5)", ERSI TS 125 331 V5.0.0, Mar. 1, 2002, pp. 37-45, 224-225, 915-919, XP002304093 France.

* cited by examiner

*Primary Examiner*—Kevin C Harper
*Assistant Examiner*—Wanda Z Russell
(74) *Attorney, Agent, or Firm*—Foley & Lardner, LLP

(57) ABSTRACT

A method and system for providing a broadcast or multicast service to a terminal device in a data network, wherein a connection state of the terminal device is switched to a dedicated channel state in which a dedicated physical channel is allocated to the terminal device, in response to a broadcast service notification. Thereby, point-to-point connections can be used for data transmission of said broadcast or multicast service, without requiring any additional responses from the concerned terminal devices.

23 Claims, 3 Drawing Sheets

SERVICE-ACTIVATION BASED STATE SWITCHING

The present application claims the benefit of priority of Provisional Application Ser. No. 60/424,705, filed Nov. 8, 2002, the contents of which are incorporated herein by reference.

FIELD OF THE INVENTION

The present invention relates to a method and device for providing a multicast or broadcast service to a terminal device, e.g. via a radio connection of a radio access network (RAN).

BACKGROUND OF THE INVENTION

Broadcast and multicast are methods for transmitting datagrams from a single source to several destinations, i.e. point-to-multipoint connection. The 3GPP ($3^{rd}$ Generation Partnership Project) specifications Release-4 and Release-99 define a cell broadcast service (CBS) allowing for low bit-rate data to be transmitted as a message-based service to all subscribers in a set of given cells over a shared broadcast channel. Furthermore, an IP-Multicast service is defined allowing for mobile subscribers to receive multicast traffic. However, this service does not allow for multiple subscribers to share radio or core network resources and as such does not offer any advantages as far as resource utilization is concerned within a PLMN (Public Land Mobile Network) and over a RAN.

In general a broadcast multicast service is a unidirectional point-to-multipoint service in which data is efficiently transmitted from a single source to multiple terminal devices or user equipments (UE) in the associated broadcast service area. Cell Broadcast services may be received by all users who have enabled the specific broadcast service locally on their UE and who are in the cell broadcast area defined for the service. In contrast thereto, multimedia broadcast multicast i.e., Multimedia Broadcast/Multicast Service (MBMS) services can only be received by such users that are subscribed to a specific multicast/broadcast service and in addition in a multicast mode have joined the multicast group associated with the specific service. Multicast subscription may he performed either upon user selection or due to home environment initiation.

It is noted that the abbreviation "UE" in this specification refers to both mobile terminal or mobile station (MS) in GSM (Global System for Mobile communications) terms and user equipment in UMTS (Universal Mobile Telecommunications System) terms.

It is envisaged that for some applications, multiple users can receive the same data at the same time. The benefit of multicast and broadcast in the network is that the data is sent once on each link. For example, in case of a GPRS (General Packet Radio Services) based core network, a Serving GPRS Support Node (SGSN) will send data once to a Radio Network Controller (RNC) of the RAN regardless of the number of base station devices, e.g. Node Bs in UMTS terms, and to UEs that wish to receive it. The benefit of multicast and broadcast on the air interface is that many users can receive the same data on a common channel, thus not clogging up the air interface with multiple transmissions of the same data.

With increasing use of high bandwidth applications in $3^{rd}$ generation mobile systems, especially with a large number of users receiving the same high data rate services, efficient information distribution is essential. Thus, broadcast and multicast are techniques to decrease the amount of data within the network and use resources more efficiently.

Point-to-multipoint services are expected to be used extensively over wireless networks, so that there is need for a capability in the PLMN to efficiently support them. In the 3GPP specifications TS 22.146 and TR 23.846, a MBMS is defined to provide this capability for broadcast/multicast services offered by the home environment and other value added service providers. The MBMS is a unidirectional point-to-multipoint bearer services in which data is transmitted from a single source entity to multiple recipients. In particular, a broadcast mode and a multicast mode is defined as nodes of operation of the MBMS.

An assumption made in the above 3GPP specifications for MBMS defines that for each MBMS service, the respective Control RNC (CRNC) or Serving RNC (SRNC) should have an MBMS context. In practice, this means that service contexts are configured at the RNC, which are not assigned to any specific UE, whereas this context is used by a number of UEs in the cell. In order to link this context with the UE specific active set e.g. of RRC (Radio Resource Control), i.e. the set which describes all the connections assigned for the UE in question, it is required that the RNC should detect those UEs which are requesting the MBMS service and for which MBMS services the RNC has already generated corresponding MBMS contexts. The RRC is a sublayer of the radio interface Layer 3 existing in the control plane only, which provides information transfer service to the non-access stratum, e.g., the core network. RRC is responsible for controlling the configuration of radio interface Layers 1 and 2 according to the OSI (Open System Interconnection) protocol layer architecture.

According to the 3GPP specification TS 25.331, the state of a UE can be divided between two ruling states RRC connected state or mode and RRC idle state or mode. In addition thereto, four sub-states have been defined. These sub-states are Cell_DCH, Cell_FACH, Cell_PCH and URA_PCH. For each of these sub states the above specification defines the transactions, which can be supported and the rules when the switching between the RRC connected states is allowed to be made.

After power on the UE enters into an Idle mode, upon which the first task to perform is the so-called IMSI/GPRS Attach procedure. As a result of this procedure the MM (Mobility Management) context is established for the UE into the core network (CN) side, which allows the activation of the MM functions for the UE. All signaling, which is required to exchange between the CN and the UE upon this phase, is made in the RRC connected mode, from which it is returned back to the Idle mode if no other procedures (e.g. mobile originated call) has been initialized after successful attachment procedure.

The UE stays in Idle Mode until it transmits a new request to establish an RRC Connection to the network. In Idle Mode the connection of the UE is closed on all layers of the access stratum. In Idle Mode the UE is identified by non-access stratum identities. In addition, the RAN has no own information about the individual Idle Mode UEs, and it can only address e.g. all UEs in a cell or all UEs monitoring a paging occasion. The RRC Connected Mode is entered when the RRC Connection is established.

The RRC states within the RRC Connected Mode reflect the level of UE connection and which transport channels that can be used by the UE. The transition to the RRC Connected Mode from the Idle Mode can only be initiated by the UE by transmitting a request for an RRC Connection. The event is triggered either by a paging request from the network or by a request from upper layers in the UE. When the UE receives a message from the network that confirms the RRC connection establishment, the UE enters the CELL_FACH or CELL_DCH state of RRC Connected Mode.

In the case of a failure to establish the RRC Connection the UE goes back to Idle Mode. Possible causes are radio link failure, a received reject response from the network or lack of response from the network (timeout).

In the CELL_DCH state, a dedicated physical channel is allocated to the UE in uplink and downlink, and its location is known on cell level based on UE mobility functionality activated in RRC connected mode. Dedicated transport channels, downlink and uplink, shared downlink transport channels, and a combination of these transport channels can be used by the UE. The CELL_DCH-state is entered from the Idle Mode through Cell-FACH state by initializing of the establishment of an RRC connection, or by sending the Cell Update request as a response to the received paging message.

In the CELL_FACH state, no dedicated physical channel is assigned to the UE. The UE continuously monitors an FACH in the downlink. The UE is assigned default common transport channels, i.e. Fast Access Channel (FACH) in downlink and Random Access Channel (RACH) in uplink, that it can use anytime according to the access procedure for that transport channel. The position of the UE is known by the RAN on cell level according to the cell where the UE last made a cell update. Upon release of the RRC connection, the UE moves to the idle mode.

In the CELL_PCH state, no dedicated physical channel is allocated to the UE and the UE is not allowed to send any data through common channels. The UE selects a PCH with a specific algorithm, and uses DRX (Discontinuous Reception) for monitoring the selected PCH. No uplink activity is possible. The position of the UE is known by the RAN on cell level according to the cell where the UE last made a cell update in CELL_FACH state. The DCCH (Dedicated Control Channel) logical channel cannot be used in this state. If the network wants to initiate any activity, it needs to make a paging request on the PCCH (Paging Control Channel) logical channel in the known cell to initiate any downlink activity. The UE is transferred to CELL_FACH state by paging from the RAN or through any uplink access.

In the URA_PCH state no dedicated channel is allocated to the UE. The UE selects a PCH with a specific algorithm, and uses DRX for monitoring the selected PCH via an associated PICH. No uplink activity is possible. The location of the UE is known on registration area level according to the registration area assigned to the UE during the last area update in CELL_FACH state. The DCCH logical channel cannot be used in this state. If the network wants to initiate any activity, it needs to make a paging request on the PCCH logical channel within the registration area where the location of the UE is known. If the UE needs to transmit anything to the network, it goes to the CELL_FACH state.

The current system is defined for point-to-point connections. However, the MBMS system cannot be designed in such a way that all authorized MBMS UEs are sending the responses to the network almost simultaneously caused by e.g. MBMS notification, to switch to the CELL-DCH state, which is required especially when the data is decided to sent by using the point-to-point connections.

SUMMARY OF THE INVENTION

It is therefore an object of the present invention to provide a state switching mechanism by means of which the network is allowed to use point-to-point connections for broadcast or multicast service transmissions.

This object is achieved by a method of providing a broadcast or multicast service to a terminal device in a data network, said method comprising the steps of:
broadcasting a service notification from said data network in response to a network-initiated creation of a service context; and
switching a connection state of said terminal device to a dedicated channel state in which a dedicated physical channel is allocated to said terminal device, in response to said service notification.

Furthermore, the above object is achieved by a system for providing a broadcast or multicast service to a terminal device in a data network, said system comprising:
broadcasting means for broadcasting a service notification from said data network in response to a network-initiated creation of a service context; and
network means for switching a connection state of said terminal device to a dedicated channel state in which a dedicated physical channel is allocated to said terminal device, in response to said service notification.

Accordingly, in a case when the service transmission occurs by using a point-to-point connections no additional signaling is required for changing the connection state of the terminal device. Moreover, the state transition can be provided even if no service related signaling messages are sent from the terminal device to the network.

The broadcast or multicast service may be an MBMS service. The notification may trigger the terminal device to listen to the related control channel. Furthermore, the notification may allow the terminal device not to respond to the received service indication.

The state switching may be performed after reception of the configuration parameters from the related control channel. The state switching may be ordered by a network element based on the configuration parameters. The state switching order may be issued to the terminal device and the network element which derives the current state of the terminal device based on the state switching order.

Furthermore, the connection state may be switched to the dedicated channel state from a paging channel state in which a connection to the terminal device is only possible via a paging channel. In particular, the connection state may be switched from a CELL-PCH state to a CELL-DCH of a UMTS radio access network.

The service notification may be caused by a network-initiated activation of a service data transmission. Other advantageous modifications are defined in the dependent claims.

BRIEF DESCRIPTION OF THE DRAWINGS

In the following, the present invention will be described on the basis of preferred embodiments with reference to the accompanying drawings, in which.

DESCRIPTION OF THE PREFERRED EMBODIMENT

Figure 1:
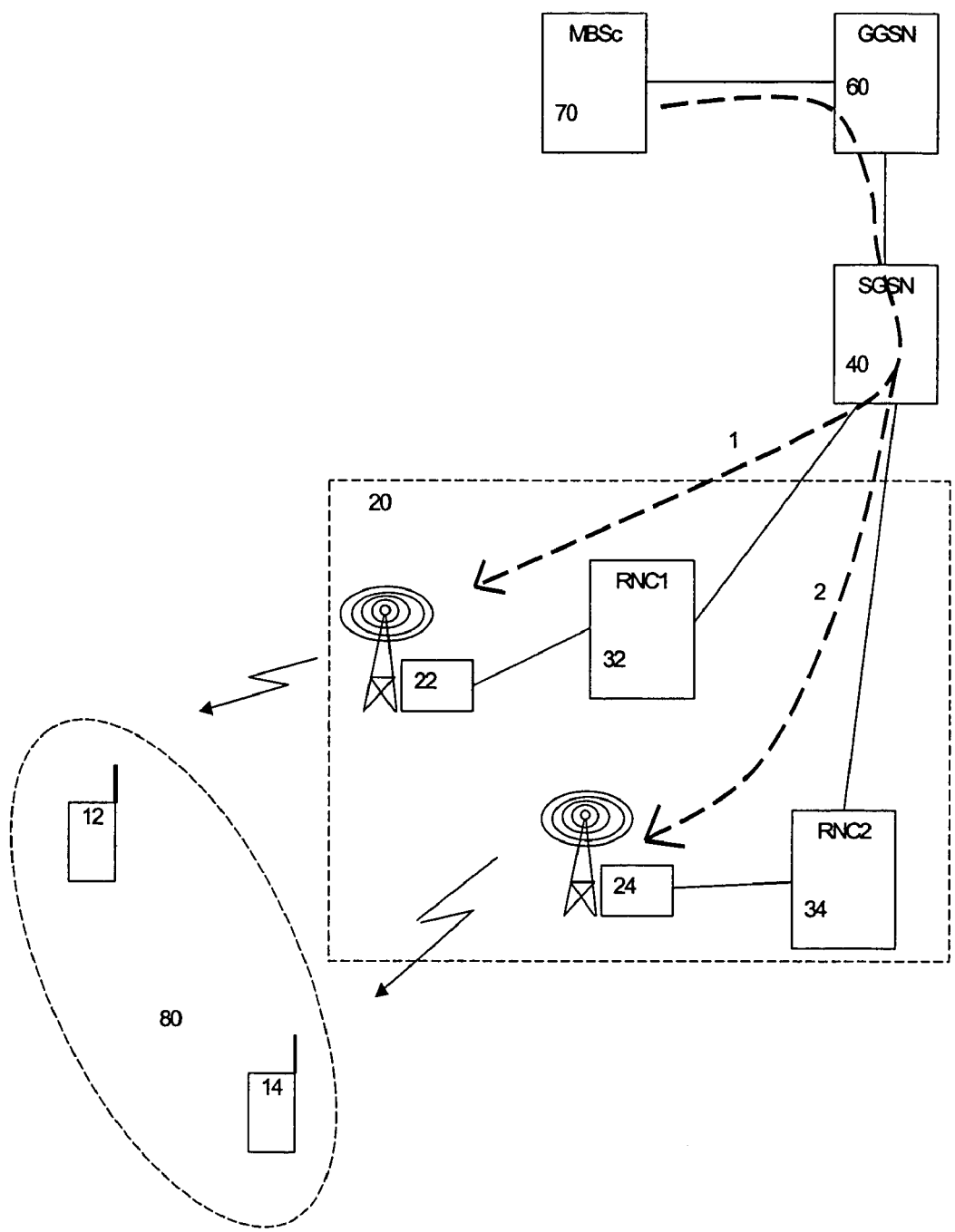
FIG. 1 shows a schematic diagram indicating an exemplary MBMS network architecture in which the present invention can be implemented.

The preferred embodiments of the present invention will now be described on the basis of an MBMS network architecture as shown in FIG. 1.

The MBMS architecture enables efficient usage of radio-network and core-network resources with the main focus on the radio interface efficiency. Specifically, multiple users are able to share common resources when receiving identical traffic. Both MBMS multicast and broadcast modes use the same low-layer bearer for data transport over the air interface of a RAN 20. According to FIG. 1, a first UE 12 and a second UE 14 are located within a broadcast or multicast area 80 and may thus receive multicast and/broadcast services via the air interface of the RAN 20. In the shown exemplary network architecture, the RAN 20 comprises two base station devices, i.e. a first node B 22 and a second node B 24 which are connected to respective first and second RNCs 32, 34. The first and second RNCs 32, 34 of the RAN 20 are connected to at least one SGSN 40 of a core network. The SGSN 40 can be connected via a Gateway GPRS Support Node (GGSN) 60 to at least one Multicast Broadcast Source 70.

In the MBMS architecture, the SGSN 40 performs user-individual service control functions and concentrates all individual users of the same MBMS service into a single MBMS service. The SGSN 40 maintains a single connection with the source of the MBMS data, e.g., the Multicast Broadcast Source 70. Furthermore, the SGSN 40 may duplicate the packets received from the GGSN 60 for forwarding to each RNC of the RAN 20 involved in provision of a specific MBMS service if no separate connections are established for each RNC in the RAN. It is noted that the SGSN 40 and the GGSN 60 are specific support nodes introduced in GPRS-based core networks to provide a packet-switched domain in the core network by establishing GTP (GPRS Tunneling Protocol) tunnels.

The GGSN 60 terminates the MBMS GTP tunnels from the SGSN 40 and links these tunnels via the initially described IP multicast functionality with a MBMS data source, e.g., the multicast broadcast source 70. In particular, the GGSN 60 duplicates the packets received from the Multicast Broadcast Source 70 for forwarding to each SGSN to which a GTP tunnel is established for a specific MBMS service.

It is noted that the present architecture allows for other MBMS data sources. Internal data sources may directly provide their data, while data delivery by external data sources may be controlled by boarder gateways (BG) which may allow for example data from single addresses and ports to pass into the PLMN for delivery by an MBMS service. The architecture assumes the use of IP multicast between the BGs and the MBMS data sources.

In the case shown in FIG. 1, the flow of multicast broadcast service data from the Multicast Broadcast Source 70 to the first and second UEs 12, 14 is indicated by respective broken arrows 1, 2. As can be seen, the multicast broadcast service data packets flow is split at the SGSN 40 into the two paths indicated by the broken arrows 1, 2.

According to the preferred embodiments, a connection state switching scheme is provided by means of which the RAN 20 can automatically switch the connection state of the first and second UEs 12, 14 from the Cell_PCH state to the Cell_DCH state. To achieve this, the connection state switching is triggered by the MBMS service notification.

Figure 2:
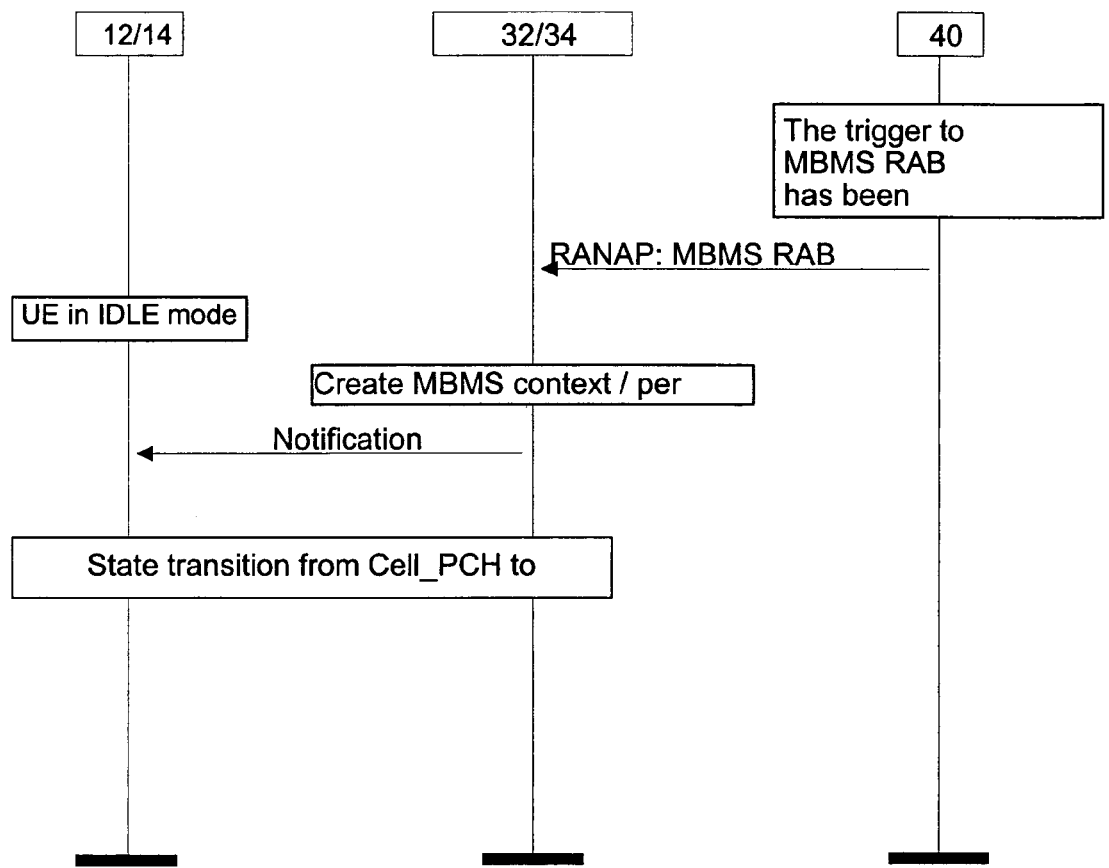
FIG. 2 shows a signaling and processing diagram according to the preferred embodiment.

FIG. 2 shows the signaling and processing diagram of the first preferred embodiment. When it is detected at the SGSN 40, that a trigger to start MBMS RAB assignment has been expired, the SGSN 40 issues an MBMS RAB assignment message using a RANAP signaling to the concerned RNCs, e.g. the first and second RNCs 32, 34. Meanwhile, the first and second UEs 12, 14 in the concerned multicast or broadcast area 80 may be in the Cell_PCH state, i.e. a state where the UE is in the RRC connected state but does not have any assigned resources from radio interface. In response to the receipt of the MBMS RAB assignment message, the first and second RNCs 32, 34 create respective MBMS contexts per service and update their service context 324. Then, the first and second RNCs 32, 34 issue corresponding notifications to the first and second UEs 12, 14 indicating the MBMS service provision. The reception of the notification initializes the reception of the MBMS service related configuration parameters from the MBMS related control channel and a connection state transition from the Cell-PCH to the Cell_DCH state of the first and second UEs 12, 14. Transition on the UE side is performed when the received MBMS service parameters indicate the use of point-to-point connections for data transmission to the first and second UEs 12, 14.

Thus, because in the suggested MBMS architecture, the state transition procedure of the UEs 12, 14 is made by using the notification procedure, no cell update messages are required from all MBMS authorized UEs. The UEs 12, 14 can receive the MBMS configuration parameters directly from downlink MBMS common control channel, and MBMS data can be send by using the point-to-point connections. Hence the main difference between the initialization of the normal mobile terminated call (MTC) and the MBMS service call by using the point-to-point channel is that when the response to the received paging message is mandatory to send in a case of MTC in order to be able to switch the UE state from CELL-PCH state to CELL-DCH state via CELL-FACH state, upon MBMS the state transition in UE is made directly from CELL-PCH state to CELL-DCH state by a command of the network.

Figure 3:
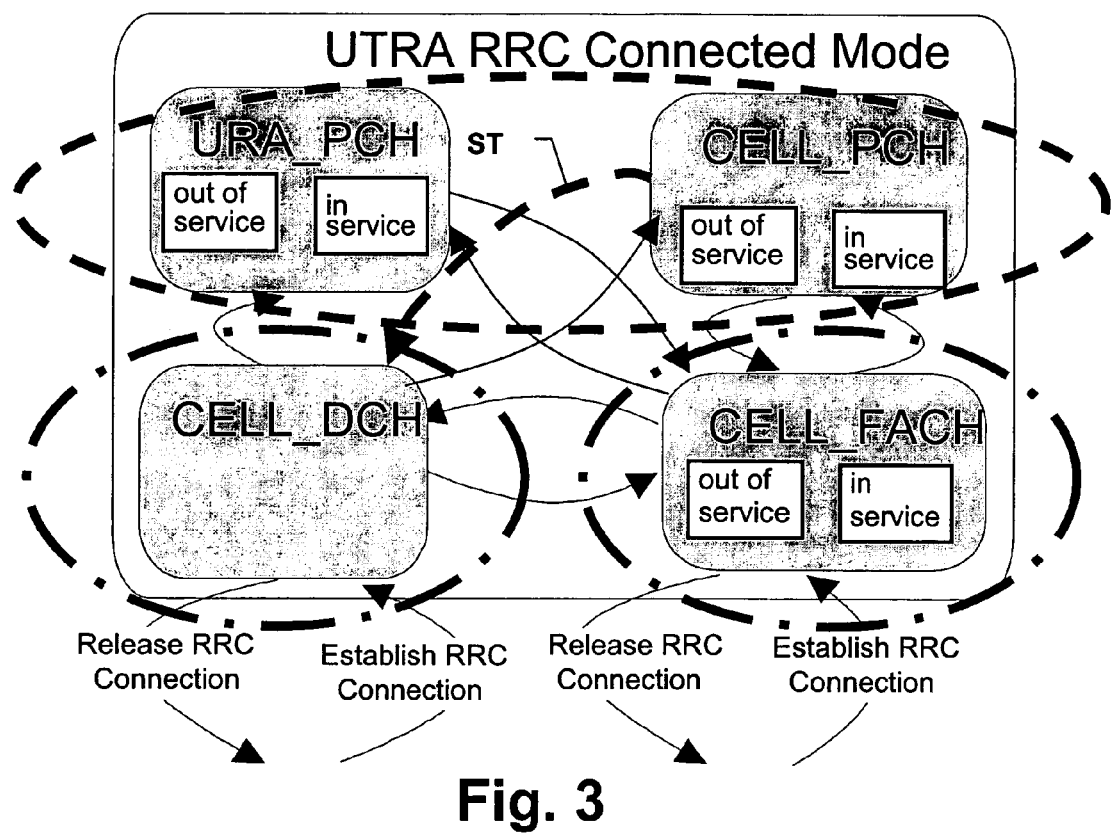
FIG. 3 shows a state transition diagram according to the preferred embodiment.

FIG. 3 shows a state transition diagram, based on the initial description, comprising the proposed state transition from the Cell-PCH to the Cell_DCH state, as indicated by the bolt broken arrow. This, state transition is initiated is triggered by the MBMS notification and the received MBMS RB parameters via the MBMS related common control channel.

It is noted that the present invention is not restricted to specific features of the above preferred embodiment but can be applied to any service provision, where a multicast or broadcast service is intended to be forward via point-to-point connections. The preferred embodiments may thus vary within the scope of the attached claims.

What is claimed is:

1. A method comprising:
   receiving a broadcast service notification from a network in response to a network-initiated creation of a Multimedia Broadcast/Multicast Service (MBMS) service context where the context is used by a number of terminals, said broadcast service notification indicating the provision of a broadcast or multicast service;
   initializing receipt of configuration parameters for a terminal device which is requesting the MBMS service from a related control channel, wherein the configuration parameters are associating with said broadcast or multicast service, in response to said receiving of said broadcast service notification from the network; and
   switching a connection state of said terminal device to a dedicated channel state in which a dedicated physical channel is allocated to said terminal device, after reception of said configuration parameters.

2. A method according to claim 1, wherein said broadcast or multicast service is an Multimedia Broadcast/Multicast Service.

3. A method according to claim 1, wherein said notification triggers said terminal device to listen to said related control channel.

4. A method according to claim 1, wherein said notification allows said terminal device not to respond to the received service indication.

5. A method according to claim 1, wherein said switching is performed after reception of said configuration parameters from said related control channel.

6. A method according to claim 5, wherein said state switching is ordered by a network element based on said configuration parameters.

7. A method according to claim 6, wherein said state switching order is issued to said terminal device and said network element derives the current state of said terminal device based on said state switching order.

8. A method according to claim 1, wherein said connection state is switched to said dedicated channel state from a paging channel state.

9. A method according to claim 8, wherein said connection state is switched from a CELL-PCH state to a CELL-DCH of a UMIS radio access network.

10. A method according to claim 1, wherein said service notification caused by a network-initiated activation of a service data transmission.

11. An apparatus comprising:
a receiver to receive a broadcast service notification from a network as a result of a network-initiated creation of a Multimedia Broadcast/Multicast Service (MBMS) service context where the context is used by a number of terminals, said broadcast service notification indicating the provision of a broadcast or multicast service;
a processor to initialize receipt of configuration parameters for a terminal device which is requesting the MBMS service from a related control channel, wherein the configuration parameters are associating with said broadcast or multicast service, after receiving of said broadcast service notification from the network; and
the processor to switch a connection state of said terminal device to a dedicated channel state in which a dedicated physical channel is allocated to said terminal device, after reception of said configuration parameters.

12. An apparatus according to claim 11, wherein said broadcast service notification is received from a Gateway General Packet Radio Services Support Node.

13. An apparatus according to claim 11, wherein said apparatus is comprised in a radio network controller.

14. An apparatus according to claim 11, wherein said apparatus is configured to switch said connection state to said dedicated channel state from a paging channel state in which a connection to said terminal device is only possible via a paging channel and after reception of said notification via said related control channel.

15. An apparatus according to claim 11, wherein said apparatus is configured to switch said connection state from a CELL-PCH state to a CELL-DCH of a UMTS radio access network.

16. An apparatus comprising:
a transmitter to broadcast a service notification as a result of a network-initiated creation of a Multimedia Broadcast/Multicast Service (MBMS) service context where the context is used by a number of terminals, said broadcast service notification indicating the provision of a broadcast or multicast service;
the transmitter to transmit configuration parameters for a terminal device which is requesting the MBMS service on a related control channel, wherein the configuration parameters are associating with said broadcast or multicast service; and
a processor to cause switching of a connection state of said terminal device to a dedicated channel state in which a dedicated physical channel is allocated to said terminal device.

17. An apparatus comprising:
means for receiving a broadcast service notification from a network as a result of a network-initiated creation of a Multimedia Broadcast/Multicast Service (MBMS) service context where the context is used by a number of terminals, said broadcast service notification indicating the provision of a broadcast or multicast service;
means for initializing receipt of configuration parameters for a terminal device which is requesting the MBMS service from a related control channel, wherein the configuration parameters are associating with said broadcast or multicast service, after receiving of said broadcast service notification from the network; and
means for switching a connection state of said terminal device to a dedicated channel state in which a dedicated physical channel is allocated to said terminal device, after reception of said configuration parameters.

18. A method comprising:
broadcasting a service notification from a network as a result of a network-initiated creation of a Multimedia Broadcast/Multicast Service (MBMS) service context where the context is used by a number of terminals, said broadcast service notification indicating the provision of a broadcast or multicast service;
initializing receipt of configuration parameters for a terminal device which is requesting the MBMS service from a related control channel, wherein the configuration parameters are associating with said broadcast or multicast service, in response to said receiving of said broadcast service notification from the network; and
causing switching of a connection state of said terminal device to a dedicated channel state in which a dedicated physical channel is allocated to said terminal device.

19. The method according to claim 18, further comprising transmitting said broadcast service notification by a Gateway General Packet Radio Services Support Node.

20. The method according to claim 18, wherein said connection state is switched to said dedicated channel state from a paging channel state.

21. An apparatus comprising:
means for broadcasting a service notification from a network as a result of a network-initiated creation of a Multimedia Broadcast/Multicast Service (MBMS) service context where the context is used by a number of terminals, said broadcast service notification indicating the provision of a broadcast or multicast service;
initializing receipt of configuration parameters for a terminal device which is requesting the MBMS service from a related control channel, wherein the configuration parameters are associating with said broadcast or multicast service, in response to said receiving of said broadcast service notification from the network; and
means for causing switching of a connection state of said terminal device to a dedicated channel state in which a dedicated physical channel is allocated to said terminal device.

22. The apparatus according to claim 21, wherein said apparatus is comprised in a Gateway General Packet Radio Services Support Node.

23. The apparatus according to claim 21, wherein means for causing switching are configured to switch said connection state to said dedicated channel state from a paging channel state.

* * * * *